US010000686B2

(12) United States Patent
Zielinski et al.

(10) Patent No.: US 10,000,686 B2
(45) Date of Patent: Jun. 19, 2018

(54) METHODS FOR TREATING A WELL BORE WITHIN AN UNDERGROUND FORMATION

(71) Applicants: Covestro LLC, Pittsburgh, PA (US); Ecolab USA Inc., St. Paul, MN (US)

(72) Inventors: David P. Zielinski, Cranberry Township, PA (US); Alan Ekin, Coraopolis, PA (US); Michael K. Jeffries, Follansbee, WV (US); Mario Roberto Rojas, Katy, TX (US)

(73) Assignees: Covestro LLC, Pittsburgh, PA (US); Ecolab USA Inc., St. Paul, MN (US)

( * ) Notice: Subject to any disclaimer, the term of this patent is extended or adjusted under 35 U.S.C. 154(b) by 537 days.

(21) Appl. No.: 14/132,236

(22) Filed: Dec. 18, 2013

(65) Prior Publication Data

US 2015/0166872 A1    Jun. 18, 2015

(51) Int. Cl.
*E21B 33/138* (2006.01)
*C09K 8/518* (2006.01)
*C09K 8/516* (2006.01)
*C09K 8/035* (2006.01)

(52) U.S. Cl.
CPC .............. *C09K 8/516* (2013.01); *C09K 8/035* (2013.01)

(58) Field of Classification Search
CPC .... C08G 18/18; C08G 18/1841; C08G 18/22; C08G 18/4018; C08G 18/4829; C08G 18/6685; C08G 18/73; C08G 18/7837; C08G 18/792; C09K 8/34; C09K 8/50; C09K 8/516; C09K 8/5086; C09K 17/30; C09K 8/518; C09K 8/68; C09K 17/48; C09K 8/24; C09K 8/426; C09K 8/506; C09K 8/703; E21B 33/138; E21B 43/025; E21B 43/267; E21B 43/04; E21B 21/003; E21B 33/12; E21B 33/134
See application file for complete search history.

(56) References Cited

U.S. PATENT DOCUMENTS

| | | |
|---|---|---|
| 2,867,278 A | 1/1959 | Mallory et al. |
| 3,126,959 A | 3/1964 | Ortloff |
| 3,181,611 A | 5/1965 | Dollarhide |
| 3,181,612 A | 5/1965 | West et al. |
| 3,379,253 A | 4/1968 | Chism |
| 3,487,080 A | 12/1969 | Matsui et al. |
| 3,623,330 A | 11/1971 | Nakade et al. |
| 3,637,019 A | 1/1972 | Lee |
| 3,726,340 A | 4/1973 | Fraser |
| 4,114,382 A | 9/1978 | Kubens et al. |
| 4,119,150 A | 10/1978 | Froelich |
| 4,191,254 A | 3/1980 | Baughman et al. |
| 4,219,624 A | 8/1980 | Fuzesi |
| 4,298,066 A | 11/1981 | Colonna et al. |
| 4,324,879 A | 4/1982 | Bock et al. |
| 4,339,343 A * | 7/1982 | Koehler ............ C08G 18/4018 252/182.26 |
| 4,452,551 A | 6/1984 | Arndt et al. |
| 4,454,252 A | 6/1984 | Meyer |
| 4,715,746 A | 12/1987 | Mann et al. |
| 4,744,700 A | 5/1988 | Andy et al. |
| 4,761,099 A | 8/1988 | Mann et al. |
| 4,792,262 A | 12/1988 | Kapps et al. |
| 4,810,820 A | 3/1989 | Slack et al. |
| 4,817,721 A | 4/1989 | Pober |
| 4,904,125 A | 2/1990 | Schmidt et al. |
| 4,965,292 A | 10/1990 | Muller et al. |
| 5,112,878 A | 5/1992 | Wishneski et al. |
| 5,124,427 A * | 6/1992 | Potter et al. ................. 528/67 |
| 5,126,170 A | 6/1992 | Zwiener et al. |
| 5,183,583 A | 2/1993 | Wishneski et al. |
| 5,208,334 A | 5/1993 | Potter et al. |
| 5,236,741 A | 8/1993 | Zwiener et al. |
| 5,243,012 A | 9/1993 | Wicks et al. |
| 5,256,729 A | 10/1993 | Kutta et al. |
| 5,444,146 A | 8/1995 | Potter et al. |
| 5,489,704 A | 2/1996 | Squiller et al. |
| 5,560,736 A | 10/1996 | Mehesch et al. |
| 5,736,604 A | 4/1998 | Luthra |
| 5,789,533 A | 8/1998 | Yamanaka et al. |

(Continued)

FOREIGN PATENT DOCUMENTS

| | | |
|---|---|---|
| CA | 650847 | 10/1962 |
| CA | 2786829 A1 | 9/2011 |

(Continued)

OTHER PUBLICATIONS

Adams et al. "Ulmans Encyclopedia of Industrial Chemistry" Polyurethanes (2012) Wiley-VCH p. 1 and 552-553.*

(Continued)

*Primary Examiner* — Angela M DiTrani
*Assistant Examiner* — Charles R Nold
(74) *Attorney, Agent, or Firm* — John E. Mrozinski, Jr.

(57) ABSTRACT

Methods of treating a well bore within an underground formation are disclosed. These methods include: (a) preparing a treatment composition by mixing a polyol-containing component and a polyisocyanate-containing component; and (b) introducing the treatment composition into the well bore. The polyol-containing component includes a polymeric polyol having a viscosity at 25° C. of no more than 1000 mPa·s and the isocyanate-containing component includes an unblocked (cyclo)aliphatic polyisocyanate polymer including allophanate groups and having a viscosity at 25° C. and at least 99% solids of no more than 1000 mPa·s.

26 Claims, No Drawings

(56) References Cited

U.S. PATENT DOCUMENTS

| | | |
|---|---|---|
| 6,013,690 A | 1/2000 | Coleman et al. |
| 6,093,342 A * | 7/2000 | Falke ................ C08G 18/4018 |
| | | 252/182.2 |
| 6,395,796 B1 | 5/2002 | Ghobary et al. |
| 6,432,864 B1 | 8/2002 | Wendel et al. |
| 6,458,293 B1 | 10/2002 | Roesler et al. |
| 6,525,107 B1 | 2/2003 | Wendel et al. |
| 6,765,111 B1 | 7/2004 | Pedain et al. |
| 6,833,424 B2 | 12/2004 | Milhem |
| 6,848,519 B2 | 2/2005 | Reddy et al. |
| 7,087,556 B2 | 8/2006 | Chen et al. |
| 7,169,876 B2 | 1/2007 | Asher |
| 7,216,711 B2 | 5/2007 | Nguyen et al. |
| 7,318,473 B2 | 1/2008 | East, Jr. et al. |
| 7,506,686 B2 | 3/2009 | Szarka |
| 7,762,329 B1 | 7/2010 | Morgan et al. |
| 7,882,894 B2 | 2/2011 | Nguyen et al. |
| 8,215,393 B2 | 7/2012 | MacKay et al. |
| 8,240,386 B2 | 8/2012 | MacKay |
| 2006/0247371 A1 | 11/2006 | Mundstock et al. |
| 2010/0087566 A1 | 4/2010 | Ballard |
| 2010/0120944 A1 | 5/2010 | Ballard |
| 2011/0009515 A1 * | 1/2011 | Casati .................... C08G 18/36 |
| | | 521/170 |
| 2011/0155374 A1 * | 6/2011 | Mackay ........................ 166/295 |
| 2012/0061083 A1 * | 3/2012 | Ballard ...................... 166/305.1 |
| 2013/0018121 A1 * | 1/2013 | Nagelsdiek ........ C08G 18/0804 |
| | | 521/170 |
| 2013/0216390 A1 | 8/2013 | Younes et al. |
| 2015/0166871 A1 * | 6/2015 | Taoutaou et al. ............... 528/67 |

FOREIGN PATENT DOCUMENTS

| | | |
|---|---|---|
| GB | 885762 | 12/1961 |
| WO | 8701757 A1 | 3/1987 |
| WO | 2007050520 A2 | 5/2007 |
| WO | 2009091909 A2 | 7/2009 |
| WO | 2012123011 A1 | 9/2012 |

OTHER PUBLICATIONS

PIB for Desmodur XP 2580.
PIB for Multranol 4012.
PIB for Arcol LHT-240.

* cited by examiner

METHODS FOR TREATING A WELL BORE WITHIN AN UNDERGROUND FORMATION

FIELD OF THE INVENTION

The present invention relates to methods for treating a well bore within an underground formation by introducing a polyurethane-forming treatment composition into the well bore.

BACKGROUND

The recovery of resources, such as natural gas or oil, from an underground formation typically entails drilling a wellbore to the formation while circulating a drilling fluid, such as a water-based or oil-based drilling mud, within the wellbore. The drilling fluid flows down through the drill pipe (sometimes called a "drill string"), exits the pipe at a location adjacent the drill bit and then flows up through an annulus formed between the outside of the pipe and the wellbore wall. Circulation of the drilling fluid lubricates the drill bit and removes cuttings from the wellbore.

A problem that has been encountered in such a resource recovery process is loss of the drilling fluid to the underground formation during circulation of the fluid in the wellbore (a problem sometimes referred to as "lost circulation"). Drilling fluids may be lost to the underground formation (instead of circulating back up the wellbore) for a variety of reasons, such as, for example, the natural porosity of formation. Lost circulation is problematic for several reasons, including, for example, the high cost of replacing lost drilling fluids and the need to interrupt drilling until a problem resulting from lost circulation (such as breakage of the drill bit) is solved.

To address this problem, "lost circulation materials" ("LCMs"), are sometimes injected into the wellbore in an attempt to seal the pores of the porous underground formation. A common LCM is cement. Cement as an LCM, however, has drawbacks. For example, cement is only of limited sealing effectiveness, is prone to cracking, typically requires a very long time, such as around 24 hours, to cure, is typically of a viscosity that does not allow it to be squeezed into cracks in an underground formation, and needs to remain immobile in order to cure.

As a result, synthetic polymers, such as polyurethanes, have also been proposed for use as an LCM. As an LCM, polyurethanes have, however, also been difficult to implement. For example, many previous polyurethane-forming compositions have had an unacceptably short pot-life (which refers to the amount of time in which the combination of an active-hydrogen functional component, such as a polyol, and an isocyanate-functional component remains pumpable). As a result, complicated and cumbersome equipment options have been proposed to keep the reactive components separated during injection into the wellbore.

As an alternative, the use of blocked polyisocyanates to form a polyurethane LCM has also been proposed. Blocked polyisocyanates, however, require removal of the blocking agent in order for the isocyanate groups to react with an active-hydrogen functional component. When a liquid system is contained under pressure, as is the case in an LCM application, it is difficult, if not impossible, to remove the blocking agent. In addition, blocked polyisocyanate resins are usually very high in viscosity. As a result, they are very difficult to pump down the well bore without the use of solvents and/or plasticizers, which can be undesirable.

As a result, it would be desirable to provide improved methods of treating a well bore within an underground formation using a treatment composition that overcomes at least some of the foregoing problems.

SUMMARY OF THE INVENTION

In some respects, the present invention is directed to methods of treating a well bore within an underground formation. These methods comprise: (a) preparing a treatment composition by mixing a polyol-containing component and a polyisocyanate-containing component; and (b) introducing the treatment composition into the well bore. In these methods (i) the polyol-containing component comprises a polymeric polyol having a viscosity at 25° C. and at least 99% solids of no more than 1000 mPa·s and (ii) the isocyanate-containing component comprises an unblocked (cyclo)aliphatic polyisocyanate polymer comprising allophanate groups and having a viscosity at 25° C. and at least 99% solids of no more than 1000 mPa·s.

In other respects, the present invention is directed to methods of treating a well bore within an underground formation that comprise: (a) preparing a treatment composition by mixing a polyol-containing component and a polyisocyanate-containing component; and (b) introducing the treatment composition into the well bore. In these methods (i) the polyol-containing component comprises a polypropylene-oxide triol having a hydroxyl number of 350 to 390 mg KOH/gram, a water content of less than 0.05% by weight, based on the total weight of the polymeric polyol, and a viscosity at 25° C. and at least 99% solids of 520 to 700 mPa·s, and (ii) the isocyanate-containing component comprises an unblocked (cyclo)aliphatic polyisocyanate polymer comprising allophanate groups, wherein the polymer comprises a trimerized reaction product hexamethylene diisocyanate and wherein the polymer has (1) an isocyanate content of 10 to 47% by weight, (2) a viscosity at 25° C. and at least 99% solids of 50 to 800 mPa·s, and (3) a monomeric isocyanate content of less than 0.5 percent by weight.

In still other respects, the present invention is directed to methods of treating a well bore within a porous underground formation that comprise: (a) preparing a treatment composition by surface mixing a polyol-containing component and a polyisocyanate-containing component; (b) introducing the treatment composition into the well bore; and (c) forcing the treatment composition into pores of the porous underground formation under sufficient pressure and for a sufficient time such that the polyol-containing component and the polyisocyanate-containing component react to form a solid polyurethane reaction product that seals pores of the porous underground formation. In these methods: (i) the polyol-containing component comprises a polymeric polyol having a viscosity at 25° C. and at least 99% solids of no more than 1000 mPa·s and (ii) the isocyanate-containing component comprises an unblocked (cyclo)aliphatic polyisocyanate polymer comprising allophanate groups and having a viscosity at 25° C. and at least 99% solids of no more than 1000 mPa·s.

The present invention also relates to, among other things, underground formations treated according to a method of the present invention.

DETAILED DESCRIPTION OF THE INVENTION

Various embodiments are described and illustrated in this specification to provide an overall understanding of the structure, function, operation, use, and manufacture of the disclosed invention(s). The various embodiments described and illustrated herein are non-limiting and non-exhaustive. Thus, the invention is not limited by the description of the various non-limiting and non-exhaustive embodiments disclosed herein. Rather, the invention is defined solely by the claims. The features and characteristics illustrated and/or described in connection with various embodiments may be combined with the features and characteristics of other embodiments. Such modifications and variations are intended to be included within the scope of this specification. As such, the claims may be amended to recite any features or characteristics expressly or inherently described in, or otherwise expressly or inherently supported by, this specification. Further, Applicant reserves the right to amend the claims to affirmatively disclaim features or characteristics that may be present in the prior art. Therefore, any such amendments comply with the requirements of 35 U.S.C. § 112 and 35 U.S.C. § 132(a). The various embodiments disclosed and described in this specification can comprise, consist of, or consist essentially of the features and characteristics as variously described herein.

Any patent, publication, or other material identified herein is incorporated herein by reference in its entirety unless otherwise indicated, but only to the extent that the incorporated material does not conflict with existing definitions, statements, or other disclosure material expressly set forth herein. As such, and to the extent necessary, the express disclosure as set forth herein supersedes any conflicting material incorporated by reference. Any material, or portion thereof, that is said to be incorporated by reference herein, but which conflicts with a definition, statement, or other disclosure material set forth herein, is only incorporated to the extent that no conflict arises between the incorporated material and the present disclosure. Applicant reserves the right to amend this specification to expressly recite any subject matter, or portion thereof, incorporated by reference herein.

Reference throughout this specification to "certain embodiments", "some embodiments", "various non-limiting embodiments," or the like, means that a particular feature or characteristic may be included in an embodiment. Thus, use of such phrases, and similar phrases, in this specification does not necessarily refer to a common embodiment, and may refer to different embodiments. Further, the particular features or characteristics may be combined in any suitable manner in one or more embodiments. Thus, the particular features or characteristics illustrated or described in connection with various embodiments may be combined, in whole or in part, with the features or characteristics of one or more other embodiments without limitation. Such modifications and variations are intended to be included within the scope of the present specification. In this manner, the various embodiments described in this specification are non-limiting and non-exhaustive.

In this specification, other than where otherwise indicated, all numerical parameters are to be understood as being prefaced and modified in all instances by the term "about", in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described in the present description should at least be construed in light of the number of reported significant digits and by applying ordinary rounding techniques.

Also, any numerical range recited herein includes all sub-ranges subsumed within the recited range. For example, a range of "1 to 10" is intended to include all sub-ranges between (and including) the recited minimum value of 1 and the recited maximum value of 10, that is, having a minimum value equal to or greater than 1 and a maximum value equal to or less than 10. Any maximum numerical limitation recited in this specification is intended to include all lower numerical limitations subsumed therein and any minimum numerical limitation recited in this specification is intended to include all higher numerical limitations subsumed therein. Accordingly. Applicant reserves the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. § 112 and 35 U.S.C. § 132(a).

The grammatical articles "a", "an", and "the", as used herein, each include "at least one" or "one or more", unless otherwise indicated, even if "at least one" or "one or more" is used in certain instances. Thus, these articles are used herein to refer to one or more than one (i.e., to "at least one") of the grammatical objects of the article. By way of example only, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

As used herein, the term "polymer" encompasses pre-polymers, oligomers and both homopolymers and copolymers; the prefix "poly" in this context referring to two or more, and the term "molecular weight", when used in reference to a polymer, refers to the number average molecular weight, unless otherwise stated.

Certain embodiments of the present invention are directed to methods of treating a well bore within an underground formation, such as a porous underground formation. In some embodiments, these methods comprise: (a) preparing a treatment composition by mixing a polyol-containing component and a polyisocyanate-containing component; and (b) introducing the treatment composition into the well bore. In some embodiments, these methods comprise (a) preparing a treatment composition by surface mixing a polyol-containing component and a polyisocyanate-containing component; (b) introducing the treatment composition into the well bore, such as by pumping; and (c) forcing the treatment composition into pores of the porous underground formation under sufficient pressure and for a sufficient time such that the polyol-containing component and the polyisocyanate-containing component react to form a solid polyurethane reaction product that seals pores of the porous underground formation. In certain embodiments, the treatment composition is prepared by mixing the polyol-containing component and the polyisocyanate-containing component above ground, i.e., surface mixing (such as by using an agitator mixer, paddle mixer, screw mixer, vibration mixer, static mixer, vertical turbine mixer, planetary mixer, ultrasonic mixer. Banbury® mixer, or a conical mixer), prior to introducing the resulting mixture, i.e., the treatment composition, into the well bore. As used herein, "polyurethane" encompasses polyurethanes that also include urea linkages, such polyurethanes sometimes being referred to in the art as polyurethane-ureas. As used herein, "solid" means an impervious, non-porous block of material of stable shape and volume.

The treatment compositions used in the methods of the present invention comprise a polyol-containing component comprises a polymeric polyol having a viscosity at 25° C. and at least 99% solids of no more than 1000 mPa·s. In certain embodiments, the polymeric polyol has a viscosity at 25° C. and at least 99% solids, of no more than 850 mPa·s, no more than 750 mPa·s or, in some cases, no more than 700 mPa·s. The viscosity values identified herein for the polymeric polyol and unblocked (cyclo)aliphatic polyisocyanate polymer refer to a value determined according to ASTM D2196 (2010). In certain embodiments, the polymeric polyol has a water content of less than 0.1% by weight, such as less than 0.05% by weight, based on the total weight of the polymeric polyol. In certain embodiments, the polymeric polyol has a hydroxyl number of from 200 to 800 mg KOH/gram, such as 300 to 500 mg KOH/gram, or, in some cases, 350 to 390 mg KOH/gram. In certain embodiments of the present invention, the polymeric polyol comprises a polypropylene-oxide triol having a hydroxyl number of 350 to 390 mg KOH/gram, a water content of less than 0.05% by weight, based on the total weight of the polymeric polyol, and a viscosity at 25° C. and at least 99% solids of 520 to 700 mPa·s. As used herein, "hydroxyl number" is the number of milligrams of potassium hydroxide required for the complete hydrolysis of the fully phthalylated derivative prepared from 1 gram of polyol. Hydroxyl number is defined by the equation: $OH=(56100/EW)=56100*(F/MW)$, wherein OH represents the hydroxyl number of the polyol. EW is the weight per molar equivalents of contained OH groups, F represents the nominal functionality of the polyol, i.e., the average number of active hydrogen groups on the initiator or initiator blend used in producing the polyol, and MW represents the nominal number average molecular weight based on the measured hydroxyl number and the nominal functionality of the polyol.

In some embodiments, the polyol-containing component is substantially or, in some cases, completely free, of any active-hydrogen containing materials other than the foregoing polymeric polyol(s). As used herein, "substantially free", when used with reference to active-hydrogen containing materials, means that such a active-hydrogen containing materials are present in the polyol-containing component in an amount of no more than 10 percent by weight, such as no more than 5 percent by weight, or, in some cases, no more than 1 percent by weight, based on the weight of the polymeric polyol having a viscosity at 25° C. and at least 99% solids of no more than 1000 mPa·s that is present in the polyol-containing component. "active-hydrogen containing materials" refers to those compounds containing Zerevitinov active-hydrogen, as described below.

Suitable polymeric polyols for use in the methods of the present invention include, without limitation, polyester polyols, polyether polyols, polythioether polyols, polyacetal polyols, and/or polycarbonate polyols.

Suitable polyester polyols can be prepared, for example, from alcohols, such as di- and/or tri-hydric alcohols, and polycarboxylic acids, such as dicarboxylic acids and/or an anhydride thereof. The polycarboxylic acids may be aliphatic, cycloaliphatic, aromatic and/or heterocyclic and may be substituted, such as by halogen atoms, and/or unsaturated. Examples of appropriate acids/anhydrides include, but are not limited to, succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids such as oleic acid which may be mixed with monomeric fatty acids, dimethyl terephthalate and terephthalic acid-bis-glycol esters. Examples of suitable alcohols include, but are not limited to, ethylene glycol, 1,2- and 1,3-propylene glycol, 1,4- and 2,3-butylene glycol, 1,6-hexane diol, 1,8-octanediol, neopentylglycol, cyclohexanedimethanol 1,4-bis-hydroxymethylcyclohexane, 2-methyl-1,3-propanediol, glycerol, trimethylolpropane, 1,2,6-hexanetriol, trimethylolethane, pentaerythritol, quinitol, mannitol and sorbitol, methyl glycoside, diethylene glycol, triethylene glycol, tetraethylene glycol, polyethylene glycols, dipropylene glycol, polypropylene glycols, dibutylene glycol and polybutylene glycols. Polyesters of lactones such as ε-caprolactone or hydroxycarboxylic acids such as Ω-hydroxycaproic acid may also be used.

Suitable polyether polyols include, for example, those having from one to four hydroxyl groups, such as three hydroxyl groups. Such polyether polyols can be prepared, for example, by the polymerization of epoxides, such as ethylene oxide, propylene oxide, butylene oxide, tetrahydrofuran, styrene oxide or epichlorohydrin, either each on its own, such as in the presence of boron trifluoride, or by addition of these epoxides, either as mixtures or successively, to starting components having reactive hydrogen atoms. Suitable starting components include water, alcohols and phenols, such as ethylene glycol, 1,3- and 1,2-propylene glycol, trimethylolpropane and 4,4'-dihydroxydiphenylpropane. In certain embodiments, the polyol-containing component comprises a polyether triol, such as a polyaddition product of ethylene oxide, propylene oxide, tetrahydrofuran, butylene oxide and epichlorohydrin, a co-addition and/or graft product thereof, and/or a polyether triol obtained by condensation of one or more trihydric alcohols and one or more polyether triols obtained by alkoxylation of trihydric alcohols, amines and aminoalcohols. In certain embodiments, the polymeric polyol comprises a polyalkoxylated triol, such as a polypropylene oxide-based triol. In certain embodiments, the treatment composition comprises a polyether polyol that is not derived from an amino-functional compound.

Suitable polythioether polyols include, for example, condensation products obtained by reacting thiodiglycol alone and/or with other glycols, dicarboxylic acids or formaldehyde, such products being polythio mixed ethers, polythioether esters or polythioether polyacetals.

Suitable polyacetal polyols include, for example, those which can be prepared from glycols such as diethylene glycol, triethylene glycol, 4,4'-dioxethoxydiphenyl dimethylmethane, hexanediol and formaldehyde. Suitable polyacetals may also be prepared by the polymerization of cyclic acetals.

Suitable polycarbonate polyols include, for example, those which can be prepared by the reaction of diols such as 1,3-propanediol, 1,4-butanediol, 1,6-hexanediol, diethylene glycol, triethylene glycol and/or tetraethylene glycol with a diarylcarbonate, such as with diphenylcarbonate or phosgene.

Polymeric polyols suitable for use in the present invention are commercially available and include, but are not limited to, those commercially available from Bayer MaterialScience LLC under the names Multranol® 4011, Multranol® 4012, Multranol® 4035, Multranol® 9158, Multranol® 9198, Arcol® PPG425, Arcol® 700, and Arcol® LHT 240.

If desired, the polyol-containing component may include a material, such as water, that forms a gas upon reaction with the isocyanate-containing component so as to form a foamed polymer.

In certain embodiments, in addition to the polymeric polyol described above, the polyol-containing component may comprise additional active-hydrogen containing compounds, such as, for example, amino-functional compounds. For example, in certain embodiments, the polyol-containing component further comprises a polyaspartic ester corresponding to the formula (I):

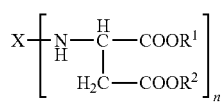

wherein: X is an aliphatic residue. $R^1$ and $R^2$ are organic groups that are inert to isocyanate groups at a temperature of 100° C. or less and may be the same or different organic groups, and n is an integer of at least 2, such as 2 to 6 or 2 to 4.

In certain embodiments, X in formula (I) is a straight or branched alkyl and/or cycloalkyl residue of an n-valent polyamine that is reacted with a dialkylmaleate in a Michael addition reaction to produce a polyaspartic ester. For example, X may be an aliphatic residue from an n-valent polyamine, such as, for example, ethylene diamine, 1,2-diaminopropane, 1,4-diaminobutane, 1,6-diaminohexane, 2,5-diamino-2,5-dimethylhexane, 2,2,4- and/or 2,4,4-trimethyl-1,6-diaminohexane, 1,11-diaminoundecane, 1,12-diaminododecane, 1-amino-3,3,5-trimethyl-5-amino-methyl-cyclohexane, 2,4'- and/or 4,4'-diaminodicyclohexylmethane, 3,3'-dimethyl-4,4'-diaminodicyclohexylmethane, 2,4,4'-triamino-5-methyldicyclohexylmethane, polyether polyamines with aliphatically bound primary amino groups and having a number average molecular weight of 148 to 6000 g/mol, isomers of any thereof, and combinations of any thereof.

In certain embodiments, X is obtained from 1,4-diaminobutane, 1,6-diaminohexane, 2,2,4- and/or 2,4,4-trimethyl-1,6-diaminohexane, 1-amino-3,3,5-trimethyl-5-aminomethylcyclohexane, 4,4'-diaminodicyclohexylmethane, 3,3'-dimethyl-4,4'-diaminodicyclohexylmethane, and/or 1,5-diamine-2-methyl-pentane.

As used herein, "inert to isocyanate groups" (as used to define $R_1$ and $R_2$ in formula (I)) means that these groups do not have Zerevitinov-active hydrogens as defined in Rompp's Chemical Dictionary (Rompp Chemie Lexikon), 10th ed., Georg Thieme Verlag Stuttgart, 1996. Generally, groups with Zerevitinov-active hydrogen are understood in the art to mean hydroxyl (OH), amino ($NH_x$), and thiol (SH) groups. In some embodiments, $R_1$ and $R_2$, independently of one another, are $C_1$ to $C_{10}$ alkyl residues, such as, for example, methyl, ethyl, or butyl residues.

In certain embodiments, n in formula (I) is an integer having a value of from 2 to 6, such as from 2 to 4, and in some embodiments, n is 2.

The polyaspartic ester may be produced by reacting a primary polyamine of the formula:

with maleic or fumaric acid esters of the formula:

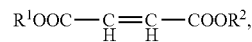

wherein X, n, $R^1$ and $R^2$ are as described earlier with respect to formula (I).

Examples of suitable polyamines include the above-mentioned diamines. Examples of suitable maleic or fumaric acid esters include dimethyl maleate, diethyl maleate, dibutyl maleate, and the corresponding fumarates.

The production of the polyaspartic ester from the polyamine and maleic/fumaric acid ester starting materials may take place at, for example, a temperature of 0° C. to 100° C. The starting materials may be used in amounts such that there is at least one equivalent, and in some embodiments approximately one equivalent, of olefinic double bonds in the maleic/fumaric acid esters for each equivalent of primary amino groups in the polyamine. Any starting materials used in excess may be separated off by distillation following the reaction. The reaction may take place in the presence or absence of suitable solvents, such as methanol, ethanol, propanol, dioxane, or combinations of any thereof.

In certain embodiments, the polyaspartic ester is a reaction product of two equivalents of diethyl maleate with one equivalent of 3,3'-dimethyl-4,4'-diaminodicyclohexylmethane. Such a reaction product has the structure:

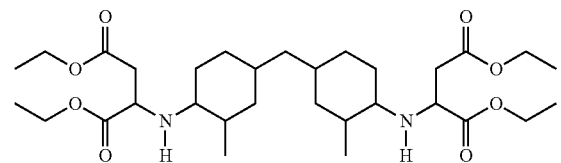 [SMILES: CCOC(=O)CC(NC1CCC(CC2CCC(NC(CC(=O)OCC)C(=O)OCC)C(C)C2)CC1C)C(=O)OCC]

Examples of suitable polyaspartic esters that may be used herein are also described in U.S. Pat. Nos. 5,126,170; 5,236,741; 5,489,704; 5,243,012; 5,736,604; 6,458,293; 6,833,424; 7,169,876; and in U.S. Patent Publication No. 2006/0247371. In addition, suitable polyaspartic esters are commercially available from Bayer MaterialScience LLC, Pittsburgh, Pa., USA, and include, for example, Desmophen® NH 1520 and Desmophen® NH 1521.

In certain embodiments, when used, the polyaspartic ester is present in the polyol-containing component in an amount, such that the weight ratio of polyaspartic ester to polymeric polyol in the polyol-containing component is 0.01 to 0.85:1, such as 0.5:1 to 0.85:1.

As indicated earlier, the treatment compositions used in the methods of the present invention comprise an isocyanate-containing component comprising an unblocked (cyclo)aliphatic polyisocyanate polymer comprising allophanate groups and having a viscosity at 25° C. and at least 99% solids of no more than 1000 mPa·s. In some embodiments of the present invention, the isocyanate-containing component is substantially or, in some cases, completely free, of any isocyanate functional materials other than the foregoing unblocked (cyclo)aliphatic polyisocyanate polymer. As used herein, "substantially free", when used with reference to isocyanate functional materials, means that such an isocyanate functional material is present in the isocyanate-containing component in an amount of no more than 10 percent by weight, such as no more than 5 percent by weight, or, in some cases, no more than 1 percent by weight, based on the weight of the unblocked (cyclo)aliphatic polyisocyanate polymer present in the isocyanate-functional component.

As used herein, "polyisocyanate" refers to an organic compound having at least two isocyanate groups per molecule, such as three or more isocyanate groups in a molecule. As used herein, "unblocked" when used with reference to a polyisocyanate, means that the polyisocyanate has at least two, such as at least three, free isocyanate groups in a molecule. It will be appreciated that a free isocyanate group is distinct from a blocked isocyanate group. A blocked isocyanate group is an isocyanate group that is internally blocked (as in uretdione-bond containing isocyanates) or externally blocked (such as those resulting from the reaction of free isocyanate groups with a blocking agent, such as, for example, a monohydric alcohol, an oxime, a lactam, a phenol, an amine, an azole, and/or a dialkyl malonate) such that the resulting blocked isocyanate group is not reactive with an active-hydrogen group until the blocking group is eliminated, for example, at an elevated temperature. A free isocyanate group, on the other hand, is reactive with an active-hydrogen group at non-elevated temperatures, such as 30° C. or less. In certain embodiments, the unblocked (cyclo)aliphatic polyisocyanate polymer comprising allophanate groups that is used in the treatment compositions used in the methods of the present invention is substantially free of blocked isocyanate groups, which, as used herein, means that any blocked isocyanate groups, if present at all, are not present in the unblocked polyisocyanate in any amount sufficient to prevent reaction of the polyisocyanate polymer with a polyol to an extent sufficient to provide a solid, impervious polyurethane if the polyisocyanate polymer and the polyol were to be mixed and maintained at a non-elevated temperature, such as 30° C. or less.

As used herein, "(cyclo)aliphatic polyisocyanate polymer comprising allophanate groups" refers to polyisocyanate polymers containing allophanate groups and aliphatically and/or cycloaliphatically bound isocyanate groups.

The unblocked (cyclo)aliphatic polyisocyanate polymer used in the treatment compositions of the methods of the present invention can be derived from a starting material corresponding to the formula: $R(NCO)_x$, in which R represents an aliphatic hydrocarbon group with from 2 to 20, such as 6 to 10, carbon atoms, a cycloaliphatic hydrocarbon group having from 4 to 20, such as 6 to 15, carbon atoms, or a xylylene group and x represents a number of from 2 to 4, such as 2.

Specific examples of such isocyanates include, but are not limited to, ethylene diisocyanate, tetramethylene diisocyanate, hexamethylene diisocyanate ("HDI"), undecamethylene diisocyanate, 2,4,4-trimethyl-1,6-diisocyanatohexane, isocyanatomethyl-3,5,5-trimethyl-cyclohexylisocyanate, 1,3-diisocyanatocyclobutane, 1,4-diisocyanatocyclohexane, 4,4'-diisocyanato-dicyclohexylmethane, 1,2-bis(isocyanatomethyl)cyclobutane, trimethylhexane-1,6-disocyanate, 1,11-diisocyanato-undecane, 3-isocyanatomethyl-3,5,5-trimethylcyclohexyl isocyanate, 4,4'-cyclohexane diisocyanate, 4,4'-dicyclohexylmethane-diisocyanate, 1,2-bis-(isocyanatomethyl)-cyclobutane, bis-isocyanatomethyl-norbornane (isomeric mixture), 3(4), 8(9)-diisocyanatomethyl-tricyclo(5,2,1,2,6)-decane, p-xylylene diisocyanate, 1,12-dodecane diisocyanate, lysine diisocyanate ($C_1$ to $C_8$-alkyl esters), 1,3-diisocyanatocyclo-hexane, and/or 1-isocyanato-3,3,5-trimethyl-5-isocyanato methyl cyclohexane (isophorone diisocyanate). In certain embodiments, the isocyanate consists essentially of HDI, which, as used herein, means that at least 90 percent by weight, at least 95 percent by weight, at least 99 percent by weight or, in some cases, 100 percent by weight, based on the total weight of isocyanate used to make the unblocked (cyclo)aliphatic polyisocyanate polymer that is used in the treatment compositions used in the methods of the present invention, is HDI.

The foregoing isocyanates may be used directly or they may be preliminarily reacted with a hydroxyl compound to form urethane-containing isocyanates. Anywhere up to 100% of the hydroxyl groups of the hydroxyl compound may be pre-reacted with a portion of the isocyanate groups present in the isocyanate to form urethane groups prior to the allophanate-forming reaction.

Higher than difunctional (cyclo)aliphatic polyisocyanates may also be used. Examples of such polyisocyanates include the trimerization products of HDI and trimerization products of 3-isocyanatomethyl-3,5,5-trimethyl cyclohexylisocyanate which contains isocyanurate groups.

Mixtures of any of the above-identified isocyanates may be used.

Hydroxyl compounds useful as starting materials include any organic compound containing at least one hydroxyl group in which no other groups that are reactive with isocyanate groups are present. Such compounds include those with alcoholic hydroxyl groups and/or phenolic hydroxyl groups.

Examples of the types of compounds containing alcoholic hydroxyl groups that are suitable for use in preparing the unblocked (cyclo)aliphatic polyisocyanate polymer that is used in the treatment compositions used in the methods of the present invention include: low molecular weight monohydric to tetrahydric aliphatic alcohols having a molecular weight of from 32 to 250 which may contain ether bridges; cycloaliphatic monovalent to tetravalent alcohols with molecular weights of from 88 to 250; araliphatic monohydric to tetrahydric alcohols with molecular weights of from 103 to 300; and polythioethers, polyacetals, polycarbonates, polyesters and polyethers having a number average molecular weight of from 250 to 5000, such as 300 to 2000.

Specific examples of suitable compounds containing alcoholic hydroxyl groups include, but are not limited to, methanol, ethanol, propanol, isopropanol, isomeric butanols, allyl alcohol, pentanols, hexanols, heptanols, 2-ethylhexanol, fatty alcohols having 10 to 20 carbon atoms, ethanediol, 1,2- and 1,3-propane diol, 1,2- and 1,3-butanediol, 1,4- and 1,5-pentanediol, neopentyl glycol, 1,6- and 2,5-hexane diol, 3-methylpentane-diol-1,5, 2-methyl-2-propylpropanediol-1,3, 2,2-diethyl-propanediol-1,3, 2-ethylhexanediol-1,3, 2,2,4-trimethylpentanediol-1,3, trimethylhexane-diol-1,6, decanediol-1,10, dodecanediol-1,2, 2-butanediol-1,4, 2-methylene-propanediol-1,3, glycerol, butanetriol, 2-hydroxymethyl-2-methylpropane diol-1,3, 1,2,6-hexanetriol, trimethylolethane, trimethylolpropane, pentaerythritol, ethyleneglycol monoalkyl- or monoaryl-ether, propyleneglycol monoalkyl ether, diethyleneglycol, triethyleneglycol, tetraethyleneglycol, cyclopentanol, cyclohexanol, methylcyclohexanol, trimethylcyclohexanol, 4-tertiarybutylcyclohexanol, menthol, borneol, isoborneol, 2-hydroxydecaline, 1,2-, 1,3-, and 1,4-cyclohexanediol, 2,4-dihydroxy-1,1,3,3-tetramethylcyclobutane, 1,4-bishydroxymethyl-cyclohexane, bis-(4-hydroxycyclohexyl)methane, 2,2-bis-(4-hydroxycyclohexyl)-propane, 2-methyl-2,4-bis-(4-hydroxycyclohexyl)-pentane, furfuryl- and tetrahydrofurfuryl-alcohol, bis-hydroxymethyl-norbornane, dihydroxymethyl-triclododecane, benzyl alcohol, phenylethyl alcohol, 3-phenyl-propanol, and 4,4'-di-(2-hydroxyethyl)-diphenylmethane.

Suitable polythioethers, polyacetals, polycarbonates, polyesters and polyethers with hydroxyl groups include those described above.

Mixtures of the hydroxyl compounds mentioned above may be used. As will be appreciated, by using a mixture of hydroxyl compounds differing in their functionality, the functionality of the polyisocyanate obtained may be adjusted.

In embodiments, any hydroxyl compound employed in preparing the unblocked (cyclo)aliphatic polyisocyanate polymer that is used in the treatment compositions used in the methods of the present invention is free of any base which may have been present during its preparation.

In certain embodiments, no other additives such as catalysts or acids are used to prepare the unblocked (cyclo)aliphatic polyisocyanate polymer. However, if an isocyanate is preliminarily converted to a urethane-containing material, it may be desirable to include a urethane catalyst in the mixture of isocyanate and hydroxyl group-containing material until the desired degree of urethane formation has been reached. The catalysts may then be removed from the reaction mixture prior to allophanate formation but such removal is not required.

When preparing the unblocked (cyclo)aliphatic polyisocyanate polymer, the reactants are, in certain embodiments, used in quantities such that from 3 to 20, such as 8 to 15, equivalents of NCO groups are present for each equivalent of hydroxyl groups. If a compound containing urethane groups is preliminarily formed from the isocyanate, an appropriate excess of isocyanate component is used.

The reaction to form the unblocked (cyclo)aliphatic polyisocyanate polymer is often carried out at a temperature of, for example, ≥150° C., such as ≥200° C. or ≥250° C., and/or for a period of from, for example, 15 seconds to 1.5 hours, such as 15 seconds to 30 minutes or 1 to 15 minutes. The allophanate-forming reaction may be carried out in the absence of oxygen to provide a low color product. In certain embodiments, the allophanatization takes place by reaction of an isocyanate-functional polyurethane with a polyisocyanate, with the addition of a suitable catalyst for the allophanatization. This may be followed by the addition, for the purpose of stabilization, of an acidic additive and the removal from the product of excess polyisocyanate, by means for example of thin-film distillation or extraction.

Examples of suitable catalysts for the allophanatization are zinc, tin, potassium, and zirconium compounds, such as Sn(II) salts, including the Sn(II) dihalides, tin or zinc soaps, such as Sn(II) bis(2-ethylhexanoate), Sn(II) bis(n-octoate), Zn(II) bis(2-ethylhexanoate) and Zn(II) bis(n-octoate), and also organotin compounds. The allophanatization catalyst is often used in an amount of up to 5% by weight, based on the overall reaction mixture, such as 5 to 500 ppm of the catalyst, or, in some cases, from 20 to 200 ppm.

Acidic additives can be Lewis acids (electron deficiency compounds) or Bronsted acids (protic acids) or compounds which react with water to release such acids. These may, for example, be organic or inorganic acids or else neutral compounds such as acid halides or esters which react with water to form the corresponding acids. Specific examples include, but are not limited to, hydrochloric acid, phosphoric acid, phosphoric esters, benzoyl chloride, isophthaloyl dichloride, p-toluenesulphonic acid, formic acid, acetic acid, dichloroacetic acid and 2-chloropropionic acid.

In embodiments, when the allophanate-forming reaction is completed, the reaction mixture is cooled to a temperature below 100° C., such as less than 70° C., or, in some cases, to 25° C. This cooling is often carried out in a period of no more than 10 minutes, such as less than five minutes.

In certain embodiments, to prepare the unblocked (cyclo)aliphatic polyisocyanate polymer, the isocyanate starting material (such as a diisocyanate, such as HDI) is introduced into the reaction vessel and the hydroxyl compound, which may be at a temperature of at least 25° C., is added thereto. Appropriate reaction vessels are known in the art.

If the same isocyanate is to be converted to a urethane containing isocyanate before being converted to the allophanate, it may be desirable to introduce excess isocyanate from the start. In such cases, the isocyanate may be used in a quantity such that the NCO/OH ratio is in the range of from 3:1 to 12:1.

In preparing the unblocked (cyclo)aliphatic polyisocyanate polymer, the nature and relative amounts of the starting materials are chosen to obtain allophanates containing at least two isocyanate groups.

As will be appreciated, therefore, the unblocked (cyclo)aliphatic polyisocyanate polymer used in some embodiments of the treatment compositions used in a method of the present invention comprises a trimerized reaction product of HDI using, for example, a metal catalyst, such as a tin or potassium catalyst, such as tin octoate or potassium octoate.

In some embodiments, the unblocked (cyclo)aliphatic polyisocyanate polymer that is used in a method of the present invention has one or more of the following properties: (1) an isocyanate content of 10 to 47 weight percent, such as 10 to 24 weight percent or 18 to 20 weight percent, (2) a viscosity at 25° C. and at least 99% solids of no more than 1000 mPa·s, such as 50 to 900 mPa·s, 100 to 900 mPa·s, 200 to 800 mPa·s or 300 to 600 mPa·s, (3) a monomeric isocyanate content of less than 3 percent by weight, such as less than 1 percent by weight, less than 0.5 percent by weight, or no more than 0.3 percent by weight; and (4) a color value (HAZEN) according to DIN 53,409 below 100, such as no more than 80.

Unblocked (cyclo)aliphatic polyisocyanate polymers suitable for use in the present invention include, for example, those described in U.S. Pat. No. 4,810,820 at col. 2, ln. 40 to col. 6, ln. 42 and col. 7, ln. 5 to col. 13, ln. 52; U.S. Pat. No. 5,124,427 at col. 2, ln. 31 to col. 7, ln. 19 and col. 8, ln. 31 to col. 11, ln. 19; U.S. Pat. No. 5,208,334 at col. 2, ln. 35 to col. 7, ln. 47 and col. 8, ln. 62 to col. 9, ln. 66; and U.S. Pat. No. 5,444,146 at col. 2, ln. 35 to col. 7, ln. 30 and col. 8, ln. 44 to 66, the cited portions of each of which being incorporated herein by reference. A specific example of an unblocked (cyclo)aliphatic polyisocyanate polymer suitable for use in a treatment composition used in a method of the present invention is Desmodur® XP 2580, from Bayer MaterialScience LLC.

In certain embodiments, in forming the treatment composition used in the methods of the present invention, the polyol-containing component and the isocyanate-containing components are combined in relative amount such that the treatment composition has a ratio of isocyanate groups to active-hydrogen groups of 0.8 to 3.0:1, such as 0.8 to 2.0:1, or, in some cases, 1:1 to 1.5:1.

In certain embodiments, at least one of the polyol-containing component and the isocyanate-containing component used to form the treatment composition used in the methods of the present invention comprises a urethane forming catalyst. Examples of such catalysts include, but are not limited to, tertiary amines and metal compounds. Some examples of suitable tertiary amine catalysts include, but are not limited to, triethylamine, tributylamine, N-methylmorpholine, N-ethyl-morpholine, N,N,N',N'-tetra-methylethylene diamine, pentamethyl-diethylene triamine, and higher homologs, 1,4-diazabicyclo[2.2.2]octane, N-methyl-N'(dimethylaminoethyl) piperazine, bis(dimethylaminoalkyl)-piperazines, N,N-dimethylbenzylamine, N,N-dimethylcyclohexylamine, N,N-diethylbenzylamine, bis(N,N-diethylaminoethyl) adipate, N,N,N',N'-tetramethyl-1,3-butanediamine, N,N-dimethyl-β-phenylethylamine, 1,2-dimethylimidazole, 2-methylimidazole, monocyclic and bicyclic amidines, bis(dialkylamino)alkyl ethers, and tertiary amines containing amide groups (preferably formamide groups). The catalyst used may also be a Mannich base of secondary amines (such as dimethylamine) and aldehydes (preferably formaldehyde) or ketones (such as acetone) and phenols.

In certain embodiments, the catalyst comprises an acid blocked amine, i.e., a delayed action amine catalyst. The blocking agent can be an organic carboxylic acid having 1 to 20 carbon atoms, such as 1 to 2 carbon atoms. Examples of blocking agents include 2-ethyl-hexanoic acid and formic acid. Such acid blocked amine catalysts are described in, for example, U.S. Pat. No. 6,013,690, at col. 9, ln. 49 to 64, the cited portion of which being incorporated herein by reference. Additional examples of suitable organic acid blocked amine catalysts which may be employed, are the acid blocked amines of triethylene-diamine, N-ethyl or methyl morpholine, N,N dimethylamine, N-ethyl or methyl morpholine, N,N dimethylaminoethyl morpholine, N-butylmorpholine, N,N' dimethylpiperazine, bis(dimethylaminoalkyl)-piperazines, 1,2-dimethyl imidazole, dimethyl cyclohexylamine. Further examples include DABCO 8154 catalyst based on 1,4-diazabicyclo[2.2.2]octane, 1,5-Diazabicyclo[4.3.0]non-5-ene, and DABCO® BL-17 catalyst based on bis(N,N-dimethylaminoethyl) ether (available from Air Products and Chemicals, Inc., Allentown, Pa.) and POLYCAT® SA-1, POLYCAT® SA-102, and POLYCAT® SA-610/50 catalysts based on POLYCAT® DBU amine catalyst (available from Air Products and Chemicals. Inc.) as described in, for example, U.S. Pat. No. 5,973,099, at col. 12, ln. 1 to 18, the cited portion of which being incorporated herein by reference. Other acid blocked amine catalysts suitable for the present invention include those described in, for example U.S. Pat. Nos. 4,219,624, 5,112,878, 5,183,583, 5,789,533, 6,395,796, 6,432,864 and 6,525,107.

Other suitable catalysts include organic metal compounds, such as organic tin, bismuth, zinc, lithium, titanium, manganese germanium, cobalt, and/or zirconium compounds. Suitable organic tin compounds include those containing sulfur, such as dioctyl tin mercaptide, and tin(II) salts of carboxylic acids, such as tin(II) acetate, tin(II) octoate, tin(II) ethylhexoate, and tin(II) laurate, as well as tin(IV) compounds, such as dibutyltin dilaurate, dibutyltin dichloride, dibutyltin diacetate, dibutytin maleate, and dioctyltin diacetate. Suitable bismuth compounds include bismuth neodecanoate, bismuth versalate, and various bismuth carboxylates. Suitable zinc compounds include zinc neodecanoate and zinc versalate. Mixed metal salts containing more than one metal (such as carboxylic acid salts containing both zinc and bismuth) are also suitable catalysts.

In some embodiments, the catalyst comprises a delayed action or heat-activated tin catalyst such as, for example, dibutyltin dimercaptide, dibutyltin diisooctylmercaptoacetate, dimethyltin dimercaptide, dibutyltin dilaurylmercaptide, dimethyltin dilaurylmercaptide, dimethyltin dithioglycolate, dimethyltin diisooctylmercaptoacetate, di(n-butyl)tin bis(isooctylmercapto-acetate), and di(isooctyl)tin bis(isooctylmercaptoacetate), all of which are commercially available. The use of other delayed action organic metal catalysts, such as an iron pentanedione or a bismuth carboxylate, is also possible. The use of encapsulated metal catalysts, such as polymer encapsulated tin catalysts, is also suitable.

The quantity of catalyst can vary depending on the specific catalyst used. In some embodiments, the catalyst is used in an amount of up to 5 percent by weight, such as 0.001 to 3 percent by weight, or, in some cases, 0.001 to 2 percent by weight, based on the total weight of the treatment composition. In fact, it has been surprisingly observed that the pot-life of certain compositions suitable for use in the methods of the present invention was actually extended by inclusion of certain organic acid blocked amine catalysts in the composition in an amount of 0.01 to 2, such as 0.1 to 1, percent by weight, based on the total weight of the treatment composition, as compared to the same treatment composition in which no such catalyst is included.

In certain embodiments, the polyol-containing component, the polyisocyanate-containing component and/or the treatment composition is a substantially 100 percent resin solids component or composition, which means that the component or composition comprises less than 10 percent by weight, less than 5 percent by weight, less than 2 percent by weight or less than 1 percent by weight of components that do not react to form a polyurethane, based on the total weight of the component or composition. In certain embodiments, the polyol-containing component, the polyisocyanate-containing component and/or the treatment composition is substantially free of water, which means that water is present in the component or composition in an amount of less than 10 percent by weight, less than 5 percent by weight, less than 2 percent by weight or less than 1 percent by weight, based on the total weight of the component or composition. In certain embodiments, the polyol-containing component, the polyisocyanate-containing component and/or the treatment composition is substantially free of volatile organic compounds (VOC), which means that VOC is present in the component or composition in an amount of less than 10 percent by weight, less than 5 percent by weight, less than 2 percent by weight or less than 1 percent by weight, based on the total weight of the component or composition.

In some embodiments, the treatment composition may comprise any of a variety of additional materials, such as rheology modifiers, defoamers, fillers (such as barium sulfate, quartz powder, silicic acid, calcium carbonate, chalk, dolomite or talcum), wetting agents (such as naphthalenesulphonic acid salts), stabilizers (such as sterically hindered phenol derivatives, amines, phosphites, xanthogene disulfides or thiuram disulfides), and surfactants (including ionic and nonionic surfactants).

The treatment compositions described herein, which involve the selection of a polyol-containing component comprising a particular polymeric polyol and an isocyanate-containing component comprising a particular unblocked (cyclo)aliphatic polyisocyanate polymer, optionally used in combination with a urethane-forming catalyst, such as a delayed action catalyst as described above, are currently believed to exhibit a surprising combination of properties that are believed to make the treatment composition particularly suitable for use as an LCM. More specifically, it has been observed that (i) because the polyol-containing component and the polyisocyanate-containing component are very compatible with each other, which means there is little or no phase separation in the mixture of the two, essentially complete reactivity of the components is provided, thereby providing the ability to surface mix the components using relatively unsophisticated equipment and yet still provide a cured polymer with good physical properties, (ii) the mixture of the polyol-containing component and the polyisocyanate-containing component, particularly in combination with certain levels of delayed action amine catalyst, can exhibit extended pot-life, low viscosity and controlled reactivity at temperatures ranging from ambient up to 200° F., which makes the composition easily pumpable (less pressure, and therefore power, is necessary to deliver the composition down the drill string) after surface mixing, while still having the ability to cure to provide a cured polymer with good physical properties at the desired time and temperature range, and (iii) the foregoing believed advantages are believed to be accomplishable without the use of blocked isocyanates, solvents and/or plasticizers, each of which can be undesirable from a performance and/or environmental standpoint in an LCM application.

As will be appreciated by the foregoing description, embodiments of the present invention are directed to methods of treating a well bore within an underground formation, comprising: (a) preparing a treatment composition by mixing a polyol-containing component and a polyisocyanate-containing component; and (b) introducing the treatment composition into the well bore, wherein (i) the polyol-containing component comprises a polymeric polyol having a viscosity at 25° C. and at least 99% solids of no more than 1000 mPa·s, and (ii) the isocyanate-containing component comprises an unblocked (cyclo)aliphatic polyisocyanate polymer comprising allophanate groups and having a viscosity at 25° C. and at least 99% solids of no more than 1000 mPa·s.

In some embodiments, the present invention is directed to a method of the preceding paragraph, wherein (a) comprises surface mixing the polyol-containing component and a polyisocyanate-containing component.

Some embodiments of the present invention are directed to a method of any of the preceding two paragraphs, wherein the polymeric polyol comprises a polyalkoxylated triol, such as a polypropylene-oxide triol, such as a polypropylene-oxide triol having a hydroxyl number of 350 to 390 mg KOH/gram, a water content of less than 0.05% by weight, based on the total weight of the polymeric polyol, and a viscosity at 25° C. and at least 99% solids of 520 to 700 mPa·s.

Certain embodiments of the present invention are directed to a method of any of the previous three paragraphs, wherein the unblocked (cyclo)aliphatic polyisocyanate polymer is derived from an isocyanate starting material comprising HDI, in some cases consisting essentially of HDI.

In some embodiments, the present invention is directed to a method of any of the previous four paragraphs, wherein the unblocked (cyclo)aliphatic polyisocyanate polymer comprises a trimerized reaction product HDI.

Some embodiments of the present invention are directed to a method of any of the previous five paragraphs, wherein the unblocked (cyclo)aliphatic polyisocyanate polymer has an isocyanate content of 10 to 24 weight percent, (2) a viscosity at 25° C. and at least 99% solids of 50 to 900 mPa·s, 100 to 900 mPa·s, 200 to 800 mPa·s or 300 to 600 mPa·s, and (3) a monomeric isocyanate content of less than 1 percent by weight.

Certain embodiments of the present invention are directed to a method of any of the previous six paragraphs, wherein at least one of the polyol-containing component and the isocyanate-containing component comprises a urethane forming catalyst comprising an acid blocked amine and/or an organic metal compound, wherein, in some embodiments, the catalyst is present in an amount of 0.01 to 2 percent by weight, such as 0.1 to 1 percent by weight, based on the total weight of the treatment composition.

Embodiments of the present invention are directed to a method of any of the previous seven paragraphs, wherein the polyol-containing component further comprises a polyaspartic ester, such as a polyaspartic ester corresponding to the formula:

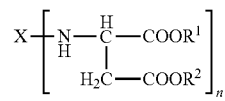

wherein: X is an aliphatic residue, $R^1$ and $R^2$ are organic groups that are inert to isocyanate groups at a temperature of 100° C. or less and may be the same or different organic groups, and n is an integer of at least 2, such as 2 to 6 or 2 to 4, such as a reaction product of two equivalents of diethyl maleate with one equivalent of 3,3'-dimethyl-4,4'-diaminodicyclohexylmethane. In such embodiments, the polyaspartic ester is present in the polyol-containing component in an amount such that the weight ratio of polyaspartic ester to polymeric polyol in the polyol-containing component is 0.01 to 0.85:1, such as 0.5:1 to 0.85:1.

As will also be appreciated from the foregoing description, some embodiments of the present invention are directed to a method of treating a well bore within an underground formation, comprising: (a) preparing a treatment composition by mixing a polyol-containing component and a polyisocyanate-containing component; and (b) introducing the treatment composition into the well bore, wherein (i) the polyol-containing component comprises a polypropylene-oxide trial having a hydroxyl number of 350 to 390 mg KOH/gram, a water content of less than 0.05% by weight, based on the total weight of the polymeric polyol, and a viscosity at 25° C. and at least 99% solids of 520 to 700 mPa·s, and (ii) the isocyanate-containing component comprises an unblocked (cyclo)aliphatic polyisocyanate polymer comprising allophanate groups, wherein the polymer comprises a trimerized reaction product HDI and wherein the polymer has (1) an isocyanate content of 10 to 47% by weight, (2) a viscosity at 25° C. and at least 99% solids of 50 to 900 mPa·s, 100 to 900 mPa·s, 200 to 800 mPa·s or 300 to 600 mPa·s, and (3) a monomeric isocyanate content of less than 0.5 percent by weight.

Some embodiments of the present invention are directed to the method of the previous paragraph wherein (a) comprises surface mixing the polyol-containing component and a polyisocyanate-containing component.

In embodiments, the present invention is directed to a method of any of the previous two paragraphs, wherein the unblocked (cyclo)aliphatic polyisocyanate polymer has an isocyanate content of 10 to 24 weight percent.

In some embodiments, the present invention is directed to a method of any of the previous three paragraphs, wherein at least one of the polyol-containing component and the isocyanate-containing component comprises a urethane forming catalyst comprising an acid blocked amine and/or an organic metal compound, wherein, in some embodiments, the catalyst is present in an amount of 0.01 to 2 percent by weight, such as 0.1 to 1 percent by weight, based on the total weight of the treatment composition.

Embodiments of the present invention are directed to a method of any of the previous four paragraphs, wherein the polyol-containing component further comprises a polyaspartic ester, such as a polyaspartic ester corresponding to the formula:

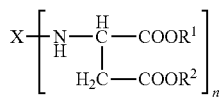

wherein: X is an aliphatic residue. $R^1$ and $R^2$ are organic groups that are inert to isocyanate groups at a temperature of 100° C. or less and may be the same or different organic groups, and n is an integer of at least 2, such as 2 to 6 or 2 to 4, such as a reaction product of two equivalents of diethyl maleate with one equivalent of 3,3'-dimethyl-4,4'-diaminodicyclohexylmethane. In such embodiments, the polyaspartic ester is present in the polyol-containing component in an amount such that the weight ratio of polyaspartic ester to polymeric polyol in the polyol-containing component is 0.01 to 0.85:1, such as 0.5:1 to 0.85:1.

As will further be appreciated from the foregoing description, some embodiments of the present invention are directed to a method of treating a well bore within a porous underground formation, comprising: (a) preparing a treatment composition by surface mixing a polyol-containing component and a polyisocyanate-containing component; (b) introducing the treatment composition into the well bore; and (c) forcing the treatment composition into pores of the porous underground formation under sufficient pressure and for a sufficient time such that the polyol-containing component and the polyisocyanate-containing component react to form a solid polyurethane reaction product that seals pores of the porous underground formation, wherein (i) the polyol-containing component comprises a polymeric polyol having a viscosity at 25° C. ad at least 99% solids of no more than 1000 mPa·s and (ii) the isocyanate-containing component comprises an unblocked (cyclo)aliphatic polyisocyanate polymer comprising allophanate groups and having a viscosity at 25° C. and at least 99% solids of no more than 1000 mPa·s.

In some embodiments, the present invention is directed to a method of the previous paragraph, wherein the polymeric polyol comprises a polyalkoxylated triol, such as a polypropylene-oxide triol, such as a polypropylene-oxide triol having a hydroxyl number of 350 to 390 mg KOH/gram, a water content of less than 0.05% by weight, based on the total weight of the polymeric polyol, and a viscosity at 25° C. and at least 99% solids of 520 to 700 mPa·s.

Some embodiments of the present invention are directed to a method of any of the previous two paragraphs, wherein the unblocked (cyclo)aliphatic polyisocyanate polymer is derived from an isocyanate starting material comprising HDI, in some cases consisting essentially of HDI.

In some embodiments, the present invention is directed to a method of any of the previous three paragraphs, wherein the unblocked (cyclo)aliphatic polyisocyanate polymer comprises a trimerized reaction product HDI.

Some embodiments of the present invention are directed to a method of any of the previous four paragraphs, wherein the unblocked (cyclo)aliphatic polyisocyanate polymer has an isocyanate content of 10 to 24 weight percent, (2) a viscosity at 25° C. and at least 99% solids of 50 to 900 mPa·s, 100 to 900 mPa·s, 200 to 800 mPa·s or 300 to 600 mPa·s, and (3) a monomeric isocyanate content of less than 1 percent by weight.

In certain embodiments, the present invention is directed to a method of any of the previous five paragraphs, wherein at least one of the polyol-containing component and the isocyanate-containing component comprises a urethane forming catalyst comprising an acid blocked amine and/or an organic metal compound, wherein, in some cases, the catalyst is present in an amount of 0.01 to 2 percent by weight, such as 0.1 to 1 percent by weight, based on the total weight of the treatment composition.

Embodiments of the present invention are directed to a method of any of the previous seven paragraphs, wherein the polyol-containing component further comprises a polyaspartic ester, such as a polyaspartic ester corresponding to the formula:

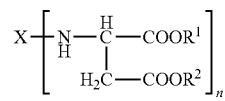

wherein: X is an aliphatic residue, $R^1$ and $R^2$ are organic groups that are inert to isocyanate groups at a temperature of 100° C. or less and may be the same or different organic groups, and n is an integer of at least 2, such as 2 to 6 or 2 to 4, such as a reaction product of two equivalents of diethyl maleate with one equivalent of 3,3'-dimethyl-4,4'-diaminodicyclohexylmethane. In such embodiments, the polyaspartic ester is present in the polyol-containing component in an amount such that the weight ratio of polyaspartic ester to polymeric polyol in the polyol-containing component is 0.01 to 0.85:1, such as 0.5:1 to 0.85:1.

Illustrating the invention are the following examples that do not limit the invention to their details. All parts and percentages in the examples, as well as throughout the specification, are by weight unless otherwise indicated.

EXAMPLES

Example 1

Mixtures of various polymeric polyols and polyisocyanates were prepared by pouring the polyol and polyisocyanate into a 2 oz. glass jar at a 50:50 ratio by weight. The mixtures were then shaken by hand for 30 seconds and observed initially for solution quality such as clear, hazy, or the formation of micelles. Upon standing for 24 hours at ambient conditions another observation was made looking for solution clarity, haze or separation. This step was repeated after 1 week. The mixtures were considered miscible if the solution was initially clear and remained so even after 1 week. All other solution conditions were considered to be immiscible. Results are set forth in Table 1.

TABLE 1

|  | Polyisocyanate $A^1$ | Polyisocyanate $B^2$ | Polyisocyanate $C^3$ |
| --- | --- | --- | --- |
| Polymeric Polyol $A^4$ | Immiscible | Immiscible | Immiscible |
| Polymeric Polyol $B^5$ | Miscible | Immiscible | Miscible |
| Polymeric Polyol $C^6$ | Miscible | Immiscible | Miscible |

[1]Desmodur ® XP 2580: An unblocked aliphatic polyisocyanate resin based on HDI containing allophanate groups and having a viscosity (at 25° C. and 99.8 wt % solids) of 200-500 cPs, an isocyanate content of 19-21%, an APHA color of ≤80, and a free HDI content of ≤0.5% based on solids.
[2]Desmodur ® N 3600: An unblocked aliphatic polyisocyanate resin based on HDI containing isocyanurate groups and having a viscosity (at 25° C. and 100 wt % solids) of 800-1400 cPs, an isocyanate content of 22-24%, a Hazen color of ≤40, and a free HDI content of ≤0.25% based on solids.

TABLE 1-continued

|  | Polyisocyanate A[1] | Polyisocyanate B[2] | Polyisocyanate C[3] |
|---|---|---|---|

[3]Desmodur ® N 3200: A biuret-modified aliphatic polyisocyanate resin based on HDI and having a viscosity (at 25° C. and 100 wt % solids) of 1300-2200 cPs, an isocyanate content of 22-24%, a Hazen color of ≤80, and a free HDI content of ≤0.7% based on solids.
[4]Multranol ® 9133: A 160-molecular-weight polypropylene oxide-based triol having a hydroxyl number (mg KOH/g) of 1,035-1,065 and a viscosity (at 25° C. and 100 wt % solids) of 1,200-1,500 cPs.
[5]Multranol ® 4012: A 450-molecular-weight polypropylene oxide-based triol having a hydroxyl number (mg KOH/g) of 350-390 and a viscosity (at 25° C. and 100 wt % solids) of 520-700 cPs.
[6]Multranol ® 4011: A 300-molecular-weight polypropylene oxide-based triol having a hydroxyl number (mg KOH/g) of 530-570 and a viscosity (at 25° C. and 100 wt % solids) of 1400-1900.

Example 2

Compositions A-K were prepared by mixing the components in the amounts listed in Table 2 (amounts are in grams). The compositions were evaluated for gel time at the temperatures listed in Table 2.

TABLE 2

|  | A | B | C | D | E | F |
|---|---|---|---|---|---|---|
| Multranol ® 4012[1] | 160.00 | 160.00 | 160.00 | 160.00 | 160.00 | 160.00 |
| Coscat ® 83[2] | — | — | — | — | — | 0.004 |
| Niax ® A 575[3] | — | — | — | — | — | — |
| Desmodur XP 2580[4] | 240.00 | 240.00 | 240.00 | 240.00 | 240.00 | 240.00 |
| Results |  |  |  |  |  |  |
| Cure temperature (° F.) | 150 | 190 | 200 | 230 | 360 | 100 |
| Gel time[5] (minutes) | 953 | 326 | 99 | 88 | 15 | 1410 |

|  | G | H | I | J | K |
|---|---|---|---|---|---|
| Multranol ® 4012[1] | 160.00 | 160.00 | 160.00 | 160.00 | 160.00 |
| Coscat ® 83[2] | 0.004 | 0.004 | — | — | — |
| Niax ® A 575[3] | — | — | 0.4 | 4.0 | 8.0 |
| Desmodur XP 2580[4] | 240.00 | 240.00 | 240.00 | 240.00 | 240.00 |
| Results |  |  |  |  |  |
| Cure temperature (° F.) | 150 | 200 | 200 | 200 | 200 |
| Gel time[5] (minutes) | 221 | 33 | 288 | 146 | 78 |

[1]A 450-molecular-weight polypropylene oxide-based triol having a hydroxyl number (mg KOH/g) of 350-390 and a viscosity (at 25° C. and 100 wt % solids) of 520-700 cPs from Bayer MaterialScience LLC.
[2]A bismuth neodecanoate urethane catalyst from Vertellus Specialties Inc.
[3]A delayed action amine gel catalyst containing cyclic amine/carboxylic acid salts from Momentive Performance Materials Inc.
[4]An unblocked aliphatic polyisocyanate resin based on HDI containing allophanate groups and having a viscosity (at 25° C. and 99.8 wt % solids) of 200-500 cPs, an isocyanate content of 19-21%, an APHA color of ≤80, and a free HDI content of ≤0.5% based on solids.
[5]The Gel time was determined by using a GARDCO GT-SHP "Hot Pot" Gel Timer. 100 grams of the composition was poured into an aluminum cup and placed into the "hot pot" of the gel timer that had already been stable at the cure temperature. The Gel Timer has a motor that rotates a stirrer that is inserted in the composition. As gelation occurs, drag eventually exceeds torque and the motor stalls. The time at which the motor stalled is the reported Gel time.

Although the invention has been described in detail in the foregoing for the purpose of illustration, it is to be understood that such detail is solely for that purpose and that variations can be made therein by those skilled in the art without departing from the spirit and scope of the invention.

What is claimed is:

1. A method of treating a well bore within an underground formation, comprising:
   (a) preparing a treatment composition by mixing a polyol-containing component and a polyisocyanate-containing component; and
   (b) introducing the treatment composition into the well bore, wherein
      (i) the polyol-containing component comprises a polypropylene-oxide polymeric polyol having a viscosity at 25° C. and at least 99% solids of no more than 1000 mPa·s, and
      (ii) the polyisocyanate-containing component comprises an unblocked (cyclo)aliphatic polyisocyanate polymer comprising allophanate groups and having a viscosity at 25° C. and at least 99% solids of no more than 1000 mPa·s, wherein the polyol-containing component and the polyisocyanate-containing component form a miscible mixture in the treatment composition.

2. The method of claim 1, wherein (a) comprises surface mixing the polyol-containing component and the polyisocyanate-containing component.

3. The method of claim 1, wherein the polypropylene-oxide polymeric polyol comprises a polypropylene-oxide triol.

4. The method of claim 3, wherein the polypropylene-oxide triol has a hydroxyl number of 350 to 390 mg KOH/gram, a water content of less than 0.05% by weight, based on the total weight of the polymeric polyol, and a viscosity at 25° C. and at least 99% solids of 520 to 700 mPa·s.

5. The method of claim 1, wherein the unblocked (cyclo) aliphatic polyisocyanate polymer is derived from an isocyanate starting material comprising hexamethylene diisocyanate.

6. The method of claim 5, wherein the isocyanate starting material consists essentially of hexamethylene diisocyanate.

7. The method of claim 6, wherein the unblocked (cyclo) aliphatic polyisocyanate polymer comprises a trimerized reaction product hexamethylene diisocyanate.

8. The method of claim 1, wherein the unblocked (cyclo) aliphatic polyisocyanate polymer has an isocyanate content of 10 to 24 weight percent, a viscosity at 25° C. and at least 99% solids of 50 to 900 mPa·s, and a monomeric isocyanate content of less than 1 percent by weight.

9. The method of claim 1, wherein at least one of the polyol-containing component and the polyisocyanate-containing component comprises a urethane forming catalyst comprising an acid blocked amine and/or an organic metal compound.

10. The method of claim 9, wherein the catalyst is present in an amount of 0.01 to 2 percent by weight, based on the total weight of the treatment composition.

11. A method of treating a well bore within an underground formation, comprising:
 (a) preparing a treatment composition by mixing a polyol-containing component and a polyisocyanate-containing component; and
 (b) introducing the treatment composition into the well bore, wherein
  (i) the polyol-containing component comprises a polypropylene-oxide triol having a hydroxyl number of 350 to 390 mg KOH/gram, a water content of less than 0.05% by weight, based on the total weight of the polymeric polyol, and a viscosity at 25° C. and at least 99% solids of 520 to 700 mPa·s, and
  (ii) the polyisocyanate-containing component comprises an unblocked (cyclo)aliphatic polyisocyanate polymer comprising allophanate groups, wherein the polymer comprises a trimerized reaction product hexamethylene diisocyanate and wherein the polymer has (1) an isocyanate content of 10 to 47% by weight, (2) a viscosity at 25° C. and at least 99% solids of no more than 50 to 900 mPa·s, and (3) a monomeric isocyanate content of less than 0.5 percent by weight,
wherein the polyol-containing component and the polyisocyanate-containing component form a miscible mixture in the treatment composition.

12. The method of claim 11, wherein (a) comprises surface mixing the polyol-containing component and a polyisocyanate-containing component.

13. The method of claim 11, wherein the unblocked (cyclo)aliphatic polyisocyanate polymer has an isocyanate content of 10 to 24 weight percent.

14. The method of claim 11, wherein at least one of the polyol-containing component and the polyisocyanate-containing component comprises a urethane forming catalyst comprising an acid blocked amine and/or an organic metal compound.

15. The method of claim 14, wherein the catalyst is present in an amount of 0.01 to 2 percent by weight, based on the total weight of the treatment composition.

16. A method of treating a well bore within a porous underground formation, comprising:
 (a) preparing a treatment composition by surface mixing a polyol-containing component and a polyisocyanate-containing component;
 (b) introducing the treatment composition into the well bore; and
 (c) forcing the treatment composition into pores of the porous underground formation under sufficient pressure and for a sufficient time such that the polyol-containing component and the polyisocyanate-containing component react to form a solid polyurethane reaction product that seals pores of the porous underground formation, wherein
  (i) the polyol-containing component comprises a polymeric polyol having a viscosity at 25° C. and at least 99% solids of no more than 1000 mPa·s and
  (ii) the polyisocyanate-containing component comprises an unblocked (cyclo)aliphatic polyisocyanate polymer comprising allophanate groups and having a viscosity at 25° C. and at least 99% solids of no more than 1000 mPa·s,
wherein the polyol-containing component and the polyisocyanate-containing component form a miscible mixture in the treatment composition.

17. The method of claim 16, wherein the polymeric polyol comprises a polyalkoxylated triol.

18. The method of claim 17, wherein the polyalkoxylated triol comprises a polypropylene-oxide triol.

19. The method of claim 18, wherein the polypropylene-oxide triol has a hydroxyl number of 350 to 390 mg KOH/gram, a water content of less than 0.05% by weight, based on the total weight of the polymeric polyol, and a viscosity at 25° C. and at least 99% solids of 520 to 700 mPa·s.

20. The method of claim 16, wherein the unblocked (cyclo)aliphatic polyisocyanate polymer is derived from an isocyanate starting material comprising hexamethylene diisocyanate.

21. The method of claim 20, wherein the isocyanate starting material consists essentially of hexamethylene diisocyanate.

22. The method of claim 21, wherein the unblocked (cyclo)aliphatic polyisocyanate polymer comprises a trimerized reaction product hexamethylene diisocyanate.

23. The method of claim 22, wherein the unblocked (cyclo)aliphatic polyisocyanate polymer has an isocyanate content of 10 to 24 weight percent, a viscosity at 25° C. and at least 99% solids of 50 to 900 mPa·s, and a monomeric isocyanate content of less than 1 percent by weight.

24. The method of claim 16, wherein at least one of the polyol-containing component and the polyisocyanate-containing component comprises a urethane forming catalyst comprising an acid blocked amine and/or an organic metal compound.

25. The method of claim 24, wherein the catalyst is present in an amount of 0.01 to 2 percent by weight, based on the total weight of the treatment composition.

26. A method of making a lost circulation material within a well bore, the method comprising:
 (a) preparing a composition by mixing a polyol-containing component and a polyisocyanate-containing component; and
 (b) introducing the composition into the well bore, wherein
  (i) the polyol-containing component comprises a polypropylene-oxide triol having a hydroxyl number of 350 to 390 mg KOH/gram, a water content of less than 0.05% by weight, based on the total weight of the polymeric polyol, and a viscosity at 25° C. and at least 99% solids of 520 to 700 mPa·s, and
  (ii) the polyisocyanate-containing component comprises an unblocked (cyclo)aliphatic polyisocyanate polymer comprising allophanate groups, wherein the polymer comprises a trimerized reaction product hexamethylene diisocyanate and wherein the polymer has (1) an isocyanate content of 10 to 47% by weight, (2) a viscosity at 25° C. and at least 99% solids of no more than 50 to 900 mPa·s, and (3) a monomeric isocyanate content of less than 0.5 percent by weight,
wherein the polyol-containing component and the polyisocyanate-containing component form a miscible mixture in the treatment composition.

* * * * *